Nov. 2, 1954 L. P. CROSMAN 2,693,593

DECODING CIRCUIT

Filed Aug. 19, 1950 6 Sheets-Sheet 1

*INVENTOR.*
LORING P. CROSMAN

*BY* Ralph W. E. Bitner

ATTORNEY

| TRIGGERS | A | B | C | D | E | F | G | H |
|---|---|---|---|---|---|---|---|---|
| 1 | L | R | R | R | L | L | L | R |
| 2 | L | L | R | R | R | R | L | L |
| 4 | L | L | L | R | L | R | R | R |

*INVENTOR.*
LORING P. CROSMAN
*BY* Ralph W. E. Bitner
ATTORNEY

Nov. 2, 1954 L. P. CROSMAN 2,693,593

DECODING CIRCUIT

Filed Aug. 19, 1950 6 Sheets-Sheet 3

| BI-QUINARY CODE | | | | | | | | | |
|---|---|---|---|---|---|---|---|---|---|
| | 1 | 2 | 3 | 4 | 5 | 6 | 7 | 8 | 9 |
| 1 | 0 | | 0 | | 0 | | 0 | | 0 |
| 2 | | 0 | 0 | | | | | | |
| 4 | | | | 0 | 0 | | | | |
| 6 | | | | | | 0 | 0 | | |
| 8 | | | | | | | | 0 | 0 |

INVENTOR.
LORING P. CROSMAN

BY Ralph W. E. Bitner

ATTORNEY

Nov. 2, 1954 L. P. CROSMAN 2,693,593

DECODING CIRCUIT

Filed Aug. 19, 1950 6 Sheets-Sheet 4

| DIGIT VALUES | | 1 | 2 | 3 | 4 | 5 | 6 | 7 | 8 | 9 |
|---|---|---|---|---|---|---|---|---|---|---|
| POWERS CODE | 1-2 | 0 | 0 | | | | | | | |
| | 3-4 | | | 0 | 0 | | | | | |
| | 5-6 | | | | | 0 | 0 | | | |
| | 7-8 | | | | | | | 0 | 0 | |
| | 9 | | 0 | | 0 | | 0 | | 0 | 0 |

INVENTOR.
LORING P. CROSMAN
BY Ralph E. Bitner
ATTORNEY

INVENTOR.
LORING P. CROSMAN
BY Ralph W. E. Bitner
ATTORNEY

Nov. 2, 1954 L. P. CROSMAN 2,693,593

DECODING CIRCUIT

Filed Aug. 19, 1950 6 Sheets-Sheet 6

INVENTOR.
LORING P. CROSMAN

BY Ralph H. E. Bitner

ATTORNEY

United States Patent Office 2,693,593

Patented Nov. 2, 1954

2,693,593

DECODING CIRCUIT

Loring P. Crosman, Wilton, Conn., assignor to Remington Rand Inc., New York, N. Y., a corporation of Delaware Application August 19, 1950, Serial No. 180,389

11 Claims. (Cl. 340—347)

This invention relates to decoding circuits, and has particular reference to circuits which employ small neon lamps as an essential part of the decoding circuit. While the invention is subject to a wide range of applications, it is especially suited for use in computing machines and in machines which employ punched data cards. Decoding circuits are old in the art, but prior arrangements have used relays, crystal diodes, resistor networks, or some form of vacuum tube circuit to achieve the result. Relay systems suffer the disadvantage of lack of speed, a feature which caused no delay in operations for the majority of applications made before the advent of electronic computers. Crystal diodes are unreliable and permit back current flow. Vacuum tube decoding devices are very fast, but the vacuum tubes require filament or heater current and are relatively expensive. The neon lamps used in the present invention are quite small, require no heater current, have low capacity and long life, and when lighted consume small amounts of power. They can be lighted in 10 microseconds and extinguished in 100 microseconds, representing a speed of operation which works well with most computing circuits and is faster than necessary for punched card machines.

One of the objects of this invention is to provide an improved decoding device which avoids one or more of the disadvantages and limitations of prior art arrangements.

Another object of the invention is to provide a decoding device which can be housed in a relatively small space.

Another object of the invention is to reduce the power input for the decoding circuit.

Another object of the invention is to provide a simple decoding circuit which is fast acting and reliable.

Another object of the invention is to provide a circuit for decoding electrical impulses representing one code into electrical impulses representing another code without recourse to mechanical movement.

One form of the invention includes a decoding device which may be set at a predetermined value. After a number of electrical impulses have been received equal to the set value, an output pulse is sent to a load circuit indicating the reception of the required number of pulses.

Another form of the invention comprises a decoding device which receives pulses arranged in the binary system of notation and decodes this data into another system of notation which is more convenient to use in calculating systems.

Another form of the invention includes a series of neon lamps in conjunction with triode vacuum tubes which transform the Powers punched card code to the denary or decimal code or to the bi-quinary code.

Still another form of the invention includes a function table type of transformation wherein two factors are transformed into a number representing their product. This latter system produces partial products for use in any multiplying computer.

For a better understanding of the present invention, together with other and further objects thereof, reference is made to the following description taken in connection with the accompanying drawings.

Figures 1, 1A:
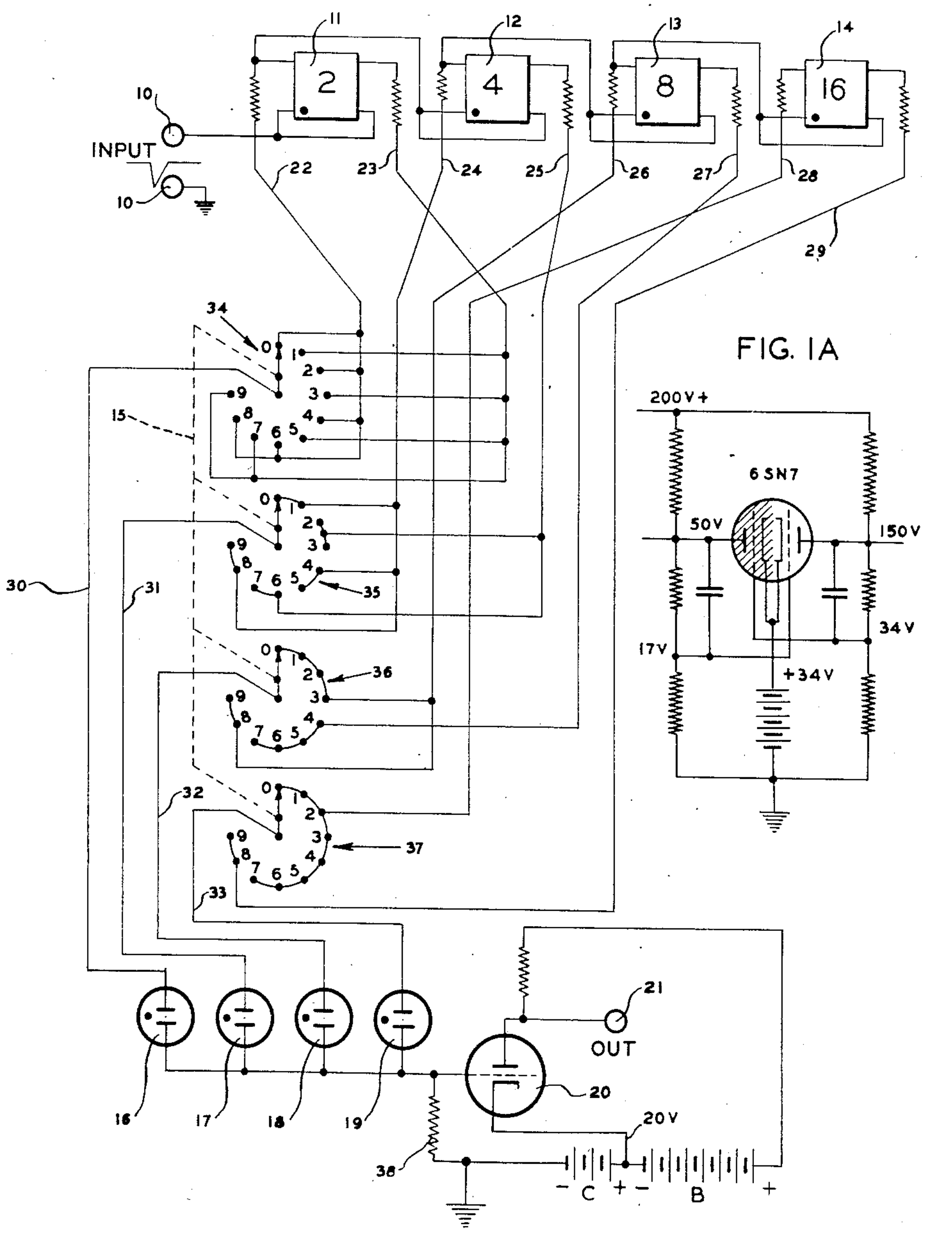
Fig. 1 is a schematic diagram of connections of a circuit which receives negative input pulses and transforms this data by means of a preset series of switches into an output pulse representing a predetermined number.
Fig. 1A is a schematic diagram of connections of a trigger circuit used in Figs. 1 and 2.

Referring now to Fig. 1, input terminals 10 receive pulses which are transferred to a series of four trigger circuits 11, 12, 13 and 14. The trigger circuits are shown in block form, their actual circuits being well known and being shown in detail in Fig. 1A. The circuits are arranged in usual binary type of counter system wherein a single pulse input actuates the first trigger stage to an actuated position. A second input pulse again actuates the first trigger stage 11 to its normal position and also actuates the second trigger circuit 12 to an actuated position. This binary counter circuit counts to values 2, 4, 8 and 16, as indicated in the blocks. Connected to all the trigger circuits is a cascade dial switch 15. This switch has four components, each comprising ten stationary contact points and a single contact arm. All four arms are secured to a shaft, and are set by a single dial to any value within the range from 0 to 9. Each moving contact arm is connected to one of a series of neon lamps 16, 17, 18 and 19, which in turn have a common terminal connected to the control electrode of a triode 20. The anode of the triode 20 is connected to an output terminal 21 which may be connected to an output load circuit or to an indicating instrument or relay to determine at what instant the number of input pulses equals the setting of the dials.

In order to explain the operation of this circuit, let it be assumed that the dial switch has been set on point 5, and that the binary counter assembly, comprising the triggers 11, 12, 13, and 14, has been zeroized. In this condition, the trigger stages supply some of the contact points with high voltage (150 volts for one class of trigger circuit) and supply another series of contact points with low potential (about 50 volts). In the zero position, conductors 22, 24, 26, and 28 are at low potential and conductors 23, 25, 27, and 29 are at high potential. Tracing these circuits through the fifth setting of the dial switch, the following conditions are present:

The first trigger circuit 11 sends a high voltage supply to the contact point 5 on dial 34, thereby transferring a high voltage over conductor 30 to neon lamp 16 which will be lighted. The second trigger circuit 12 sends a low voltage over conductor 24 to the fifth point on the second component 35 of the dial switch, and thereby transfers a low voltage over conductor 31 to neon lamp 17 which will not be lighted. The third trigger circuit 13 sends a high voltage over conductor 27 to the fifth point, which in turn sends a high voltage over conductor 32 to neon lamp 18 which will be lighted. The fourth trigger circuit 14 sends a low voltage over conductor 28 to the fifth point, which in turn sends a low voltage over conductor 33 to lamp 19 which will not be lighted. Thus, the zero setting of the binary counter lights two neon lamps 16 and 18, which causes an appreciable current to flow through resistor 38, raising the potential of the control electrode in triode 20 and lowering the potential of the output terminal 21. This lowered potential is a signal that the binary count does not equal the setting of the dial switch. A similar circuit analysis with a count of 1, 2, 3 and 4, will show that at least one or more neon lamps will be lighted at these settings. When a count of 5 is received in the binary counter, the first trigger circuit 11 is conducting on the right, trigger circuits 12 and 14 are conducting on the left, and trigger circuit 13 is conducting on the right. This condition produces a voltage distribution which sends a low potential to the fifth point on the first dial over conductor 23, a low potential to the fifth point on the second dial 35 over conductor 24, a low potential to point 5 on the third dial 36 over conductor 27, and a low potential to point 5 on the fourth dial 37 over conductor 28. All neon lamps receive low voltages and, therefore, none of them will be lighted. This lowers the potential of the control electrode in triode 20 to a value below the cut-off point (—20 volts), and the output terminal 21 assumes the same potential as the anode supply. This increased potential is a signal to an output load circuit that the count in the binary arrangement is equal to the setting of the dial switch. By a detailed examination of the circuit connections, it will be evident that all counts of the binary system will produce lighted neon lamps except the one condition when the count in the binary system is the same as the dial setting.

Figures 2, 2A:
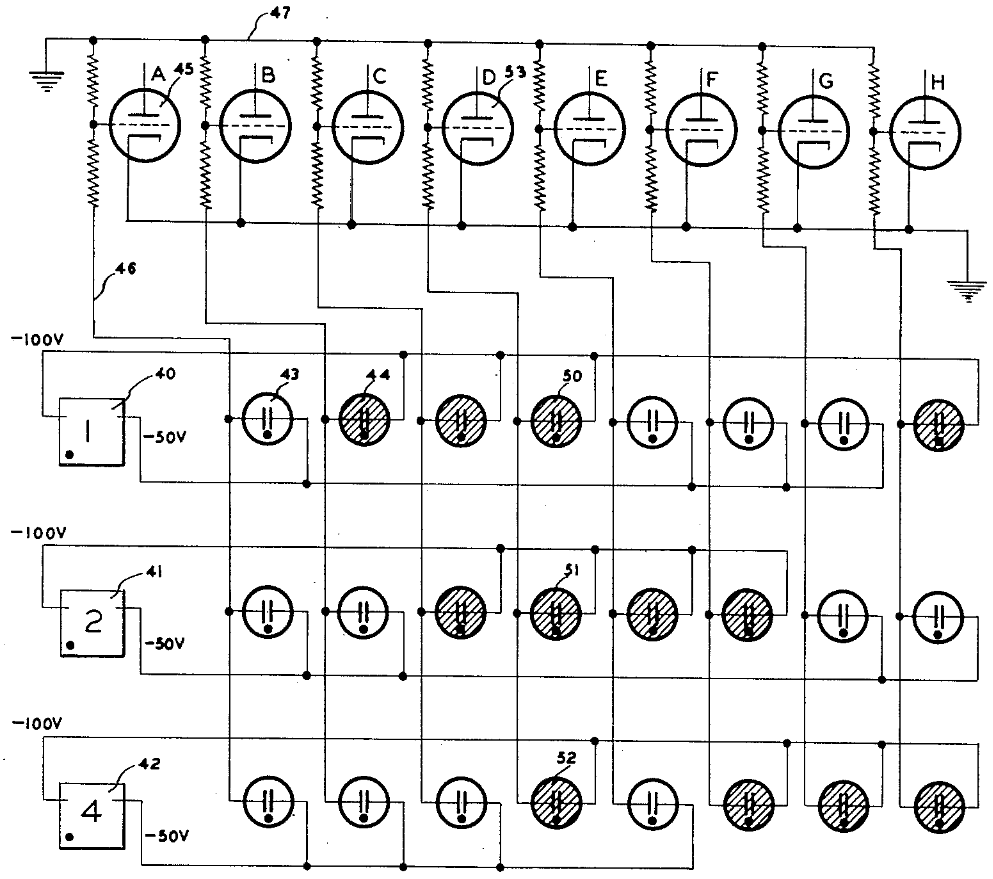
Fig. 2 is a schematic diagram of connections of a circuit which receives indications from three trigger stages and transforms this data into a single pulse on any one of eight output circuits.
Fig. 2A is a chart representing the decoding system contained in Fig. 2.

Fig. 2 shows a decoding device which translates the count in a binary trigger counter to a series of electron discharge devices, each of which represents a single digit. The triggers 40, 41, and 42 are shown in block form with output leads only and represent the usual stabilized trigger circuit, a detailed circuit diagram of which is shown in Fig. 1A. In this case the bias arrangement and the power supply for the trigger circuits are such that the output lines will assume a voltage of —50 volts below ground when that portion of the trigger circuit is non-conducting, and will assume a voltage of —100 volts when that side of the trigger circuit is in the conducting position. The voltage values marked on the trigger circuits in Fig. 2 are the normal voltages which the binary counter produces in its zeroized condition. All the neon lamps shown in Fig. 2 are connected through two resistors to ground with their other terminal connected to one of the two output lines from one of the three trigger circuits. For example, neon lamp 43 receives a potential of —50 volts on its right hand electrode, and zero potential on its left hand electrode, this voltage being insufficient to light the lamp. Neon lamp 44, on the other hand, receives a potential of 100 volts on its right hand electrode with its left hand electrode connected to ground, and this lamp will then be lighted. A simple circuit analysis will indicate that all the lamps having cross hatched lines will be lighted when the binary counter is in its zeroized condition, and it is obvious that only one of the triodes 45 has its control electrode connected to a conductor 46, which leads to three unlighted lamps. All the other triodes are connected to a conductor which runs to at least one lighted lamp. When one or more neon lamps are lighted, the current they consume must run from the ground line 47 through two resistors, through the lighted lamps to a conductor having a —100 voltage impressed thereon, through the trigger circuit back to ground. The current through the resistors changes the voltage of the control electrode from a normal value of zero volts to —20 volts or lower if more than one neon lamp is lighted. The electron discharge devices indicated by letters A to H, inclusive, have a normal cut-off value of 15 volts and, therefore, when any of the associated neon lamps are lighted, the triodes are placed in a non-conducting condition. In the example shown in Fig. 2, with the binary counter in its zero position, only the first triode 45 is conducting. Other conditions of the counter are indicated in the chart shown in Fig. 2A where the various trigger combinations are shown. In this chart, letter L means that the trigger stage is conducting on the left hand side, while the letter R indicates that the trigger has been actuated to conduct on the right hand side.

To further explain the operation of this circuit, let it be assumed that all the triggers have been actuated and are conducting on their right hand side, thereby indicating a count of 7. An analysis of the circuit will indicate that neon lamps 50, 51, and 52 will all receive an impressed voltage of —50 volts and will, therefore, not be lighted. This will place the triode 53 in a conducting condition. All the other triodes will be associated with one or more lighted neon lamps and will, therefore, have their control electrode reduced below the cut-off value and will not conduct current through their anode circuit.

Figures 3, 3A:
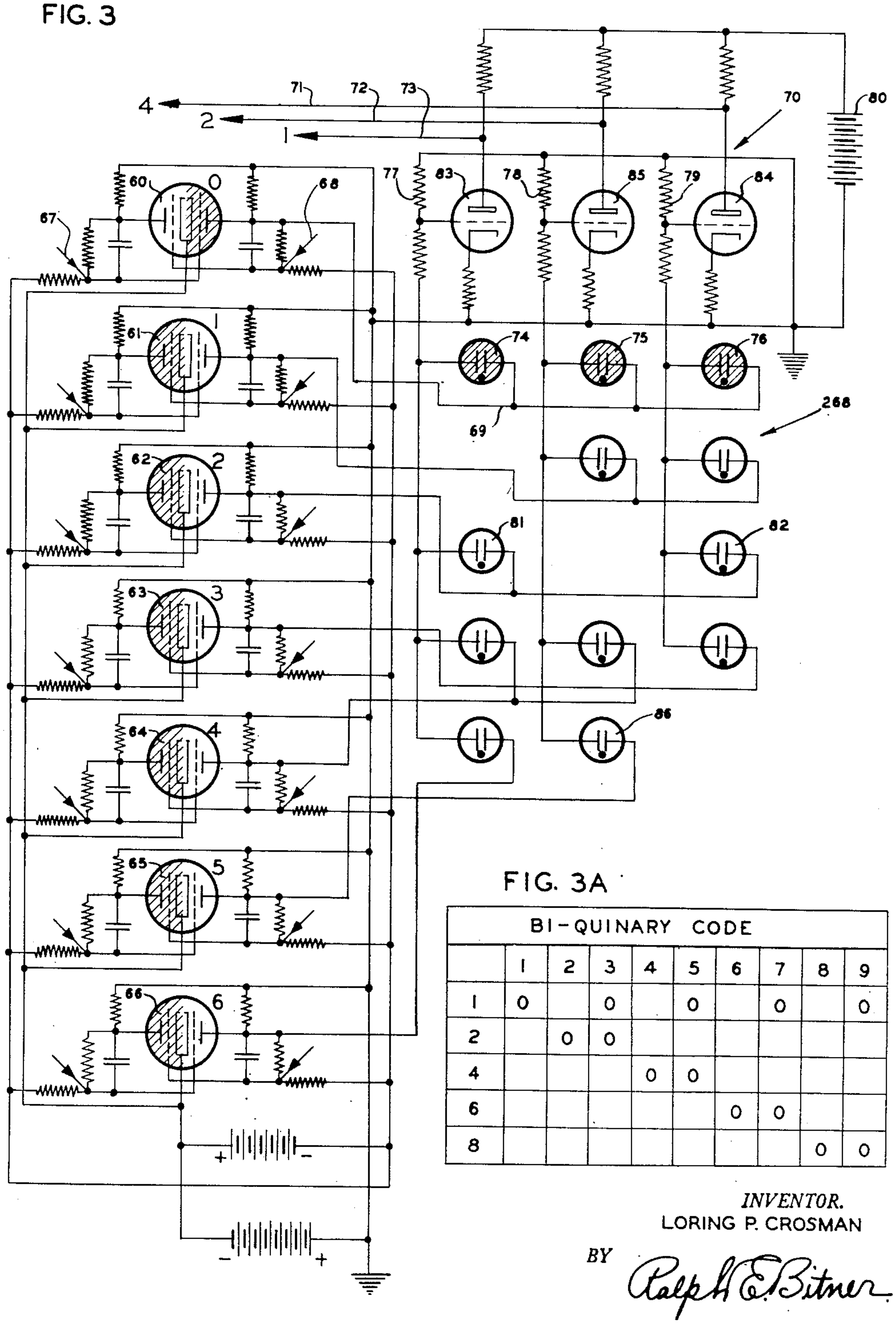
Fig. 3 is a schematic diagram of connections of a circuit which performs the reverse operation of the circuit in Fig. 2, receiving a decimal number and transforming it into a binary number indicated by output pulses on three lines.

The circuit shown in Fig. 3 is used for encoding the coded values produced by the circuit of Fig. 2. The circuit consists of seven stabilized trigger circuits 60 to 66, inclusive. The trigger circuits are actuated by the application of a negative pulse applied to wires 67 or 68, or the actuation may be accomplished in any of the well known processes. The decoding of the binary set of values is accomplished by a plurality of neon lamps 268, and the results are transferred by a series of three vacuum tubes 70 and are sent out over three conductors 71, 72, and 73. In order to provide the proper bias voltages for the control electrodes of the vacuum tubes 70, it is necessary to keep the cathodes of the trigger circuits at a negative potential and the anode circuit is at or near ground potential. In the drawing in Fig. 3, the cross-hatched areas indicate which neon lamps are lighted and the conducting condition of the trigger circuit tubes, and in this example, tube 60, having a digit value of zero, is shown conducting on the right side while all the other trigger tubes are conducting on the left. The three top neon lamps 74, 75, and 76 are lighted because their right hand terminals are connected to a common conductor 69 which is connected to the right hand anode of triode 60 which is at low potential. The left hand terminals of neon lamps 74, 75, 76 are connected through voltage dividers 77, 78, and 79 to ground potential, thereby applying a voltage of approximately 100 volts across their terminals and causing them to pass current. All the other neon lamps in this circuit have their left terminals connected through one of the voltage dividers 77, 78, and 79, but their right terminals are connected to one of the anodes of the remaining tubes 61 to 66, inclusive, these non-conducting anodes being at a voltage of approximately 50 volts below ground and, therefore, do not provide the proper overall potential drop to light the remaining lamps. When the lamps 74, 75, and 76 are lighted, they pass current which flows through the voltage dividers 77, 78, and 79, and causes the control electrodes of each triode to assume a voltage of —20 volts, this voltage being below the cut-off potential, thereby insuring no current flow through the anode circuit, and applying a maximum supply potential from battery 80 to the three output conductors 71, 72, and 73. This high voltage is used in another load circuit to indicate the absence of values and, therefore, the interpreted value of this circuit condition is zero.

To indicate the operation of the decoding action, let it be assumed that the first trigger circuit has been actuated so that it conducts on the left, thereby extinguishing tubes 74, 75, and 76, and that trigger circuit 62 has been actuated so that it conducts on the right, thereby providing a voltage which will light neon lamps 81 and 82. Current through lamps 81 and 82 provides the same cut-off voltages for control electrodes of tubes 83 and 84 as did the current through neon tubes 74 and 76 and, therefore, output conductors 73, representing a single binary value, and conductors 71, representing a binary value of four, will have their maximum voltage and will be interpreted as having no value in the load circuit. However, there is no current sent through voltage divider 78 and, therefore, the control electrode of triode 85 will assume a potential in the neighborhood of ground potential and this will permit current to flow through the anode-cathode circuit, lowering the voltage on conductor 72 and transmitting to a load circuit the intelligence that a binary value of two is indicated. If now the trigger circuit 65 is actuated so that it conducts on the right with all the other trigger tubes conducting on the left, then it will be obvious that only one neon tube 86 will be lighted and that only one triode 85 will be cut off, thereby permitting triodes 83 and 84 to pass current and communicating this condition over conductors 71 and 73 to produce a binary count of four plus one. The value of seven in the binary code is produced by triggering the tubes 60 to 66, inclusive, so that they all conduct on the left, thereby lighting none of the lamps and permitting zero bias voltages to be applied to all three control electrodes of tubes 83, 85, and 84, causing them all to conduct and communicating the binary value of seven over all three wires 71, 72, and 73.

Figures 4, 5:
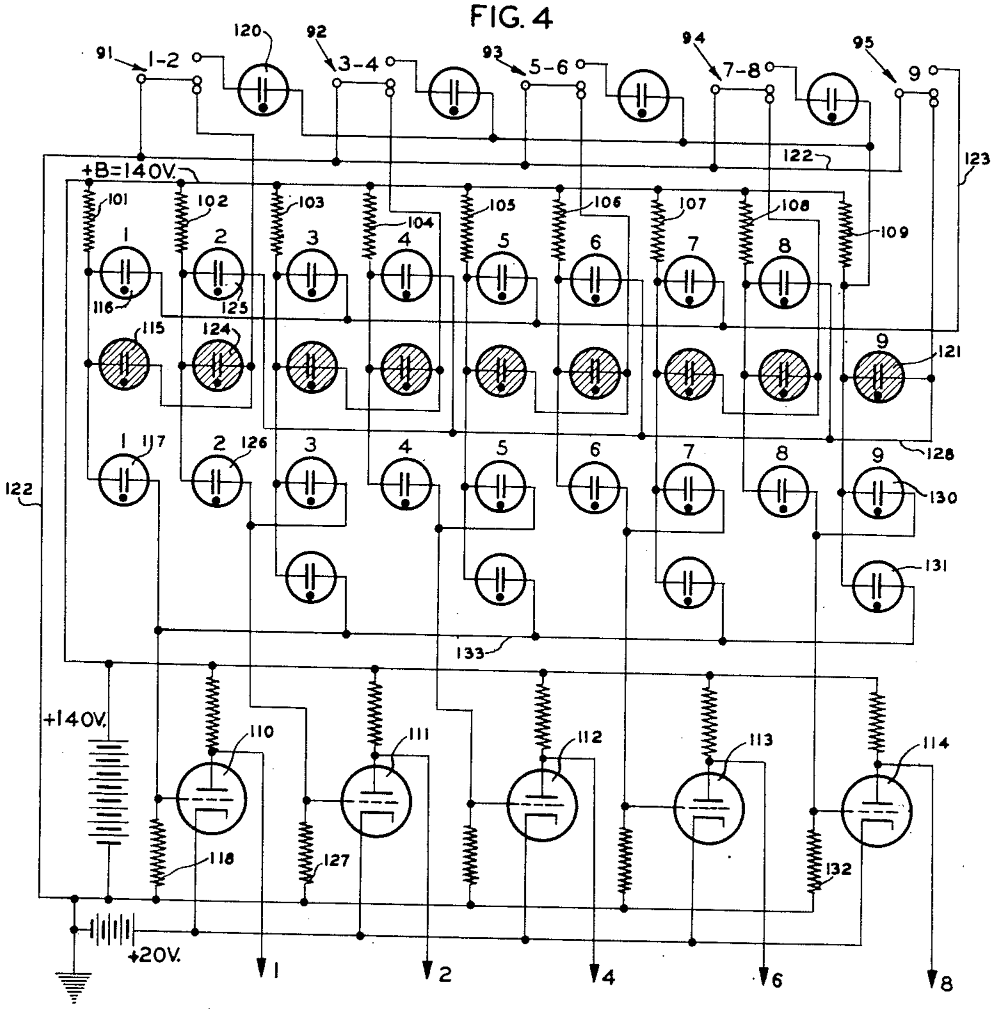
Fig. 4 is a schematic diagram of connections which receives the well known Powers punched card code and transforms it into the bi-quinary code shown in Fig. 3A.
Fig. 5 is a chart showing the Powers code in comparison to the denary or decimal code.

The circuit shown in Fig. 4 is designed to transmit coded values sensed from a Powers 90-column data card having the code shown in Fig. 5 and encode these values into a bi-quinary system as indicated by conductors at the bottom of Fig. 4 having the designated values 1-2-4-6-8. In transferring from one code to the other the Powers 90-column code is first decoded into the usual decimal system having values ranging from zero to nine, inclusive, and then a second transformation encodes the decimal values into the bi-quinary code. It is assumed that the values in the punched data card are being sensed by mechanical means and that this means is used to throw switches 91 to 95, inclusive, each of these switches being a single pole, double throw mechanical switch. The circuit which first decodes the Powers code into the decimal system, and then encodes the decimal system into the bi-quinary system, comprises nine resistors 101–109, inclusive, and thirty-four neon lamps. The circuit which transmits the coded values to a utilization circuit comprises five triode vacuum tubes 110 to 114, inclusive, and their attendant resistors and power supply. When a zero value is sensed or when there is no sensed value at all, the switches 91–95 are all in their lower or unactuated position, and in this condition only those neon lamps which are cross-hatched will be lighted. There is no current through the resistors which connect each control electrode of the triodes to ground, and since the cathodes are at a positive potential of twenty volts, each of the triodes 110–114 is in its cut-off condition and these tubes will not conduct current. This means that the five output conductors designated 1-2-4-6-8 will be 140 volts above ground, and in this condition represent a zero bi-quinary value.

In order to explain the operation of this circuit, let it be assumed that a "1" is sensed in a card which raises switch 91 to its upper position, no other switches being actuated. Neon lamps 115 and 124 will go out because their right hand terminals are connected to the lower contact point of switch 91 which is disconnected due to the sensing operation. When lamp 115 goes out the potential at the lower end of resistor 101 is raised from 60 volts toward 140 volts, but lamp 116 cannot be lighted because its right hand terminal is connected to the upper contact point of switch 95 which is now disconnected. Lamp 117 does light, however, because of the direct connection between the lower end of resistor 101 and the upper end of resistor 118 which is connected to ground. The lighting of lamp 117 reduces the potential of the lower end of resistor 101 to about 80 volts, and this together with the drop of 60 volts through tube 117, gives the control electrode of triode 110 a voltage of plus 20 volts which is the same as the cathode potential. The voltage of the control electrode cannot rise above the 20 volt value since this condition will draw current through the tube and further limit the control voltage. With the control electrode at the same voltage as the cathode the tube 110 is in a conducting condition and the output conductor 1 is lowered in potential, and a binary value of "1" is indicated to an output circuit. During the sensing of a "1" value from the Powers code, lamp 125 is lighted since a circuit can be traced from the 140 volt line through resistor 102, through lamp 125, over conductor 128, through switch 95 to ground. Another circuit was made from the upper contact of switch 91 which may be traced through neon lamp 120 to the lower end of resistor 109. However, this circuit will not cause lamp 120 to be lighted because neon lamp 121 is in parallel connection with lamp 120, and since these lamps cannot be lighted in parallel, there is no change in current flow. Lamp 126 cannot be lighted because of the potential drop in resistor 102 caused by the current through lamp 125.

Now let it be assumed that a "2" is sensed from the Powers card. This means that switch 91 and switch 95 are both raised to an actuating position, breaking the lower contacts and making the upper. In this condition lamps 115 and 121 are extinguished but this time lamp 116 is switched on instead of lamp 117. The circuit for lamp 116 may be traced from grounded conductor 122 to the common point of switch 95, thence to the upper contact and over conductor 123 to right hand side of lamp 116, thence to the lower end of resistor 101 and to the 140-volt conductor. Since lamp 116 is lighted, lamp 117 cannot be lighted and there will be no conduction through triode 110. During this operation lamp 124 goes out because switch 91 has been raised and the right hand terminal of this lamp is, therefore, not connected to ground. Also, lamp 125 cannot be lighted because its right hand terminal is connected to the lower contact point of switch 95 which is now open. Therefore, lamp 126 must be lighted since it is connected through resistor 102 to the 140-volt line on the left hand side, and to the resistor 127 and ground on its right hand side. Lighting lamp 126 raises the potential of the control electrode of triode 111, changing the voltage on output conductor 2 and giving an indication over this conductor to a load circuit.

When switch 91 is raised to make the upper contacts, lamp 120 is lighted because of the circuit which may be traced from grounded conductor 122 through the switch, through lamp 120 to the lower end of resistor 109. Since lamp 120 is lighted by current through resistor 109, the lower end of the resistor has reduced voltage and, therefore, no other lamps in the "9" arrangement are lighted.

The circuits associated with switches 92, 93, and 94 are in every way similar to the circuit associated with switch 91, and their action is the same. However, when a "9" is sensed only one switch 95 is raised. When a "9" is sensed lamp 121 goes out, since its right hand terminal leads to the lower contact point of switch 95 which is now open. This raises the potential on the lower end of resistor 109 and lights lamps 130 and 131. One circuit may then be traced from the 140-volt conductor through resistor 109 through lamp 130 to the control electrode of triode 114, resistor 132 and ground. Current through this circuit provides the operating potential for conduction of triode 114 and an operating signal over the bi-quinary line 8. A second circuit may be traced from the 140-volt line through resistor 109 through lighted lamp 131 over conductor 133 to the control electrode of triode 110 through resistor 118 to ground. This causes the conduction of current through triode 110 and the additional change in voltage over output conductor 1.

Figure 6:
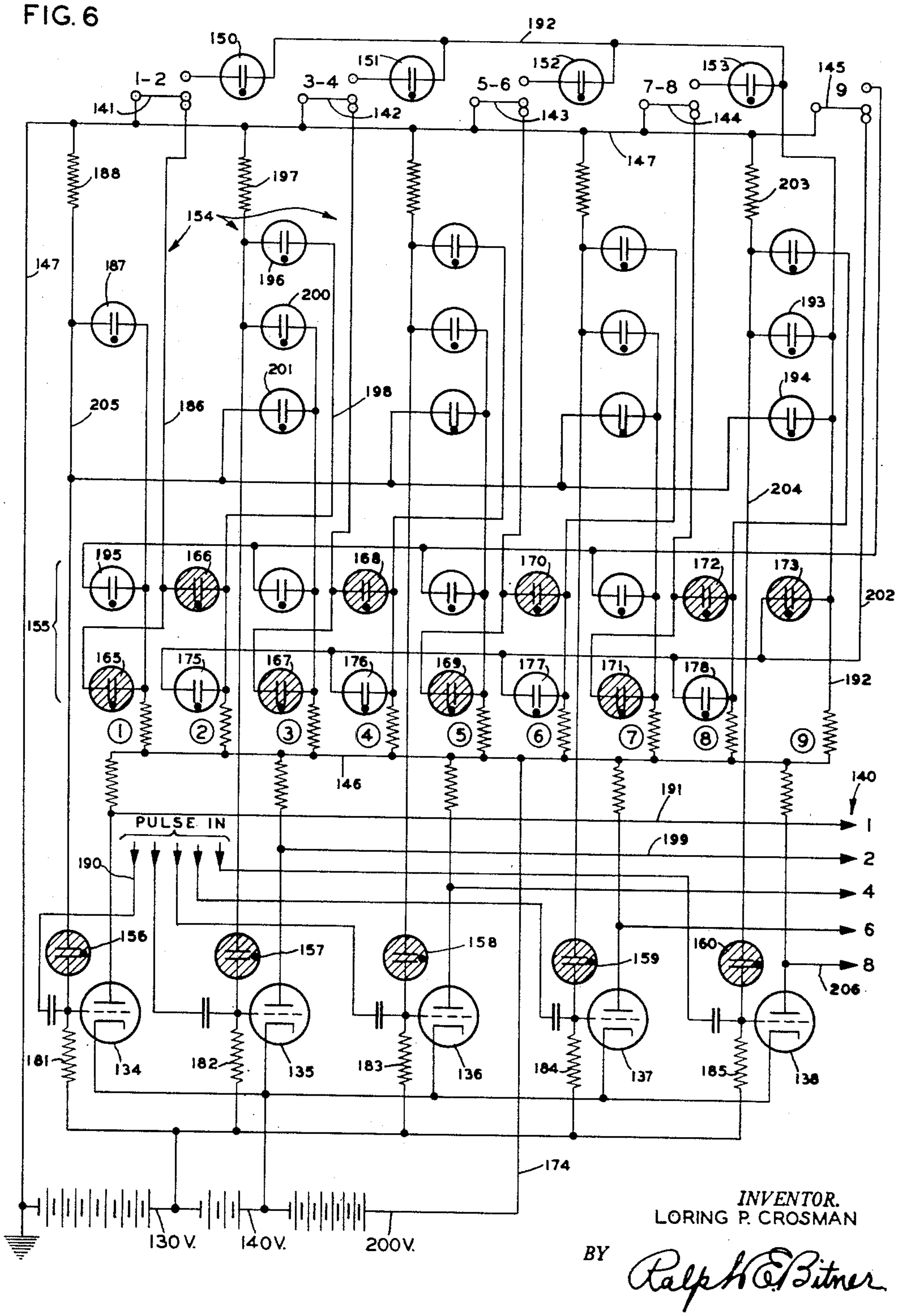
Fig. 6 is a schematic diagram of connections showing a circuit having the same functional result as Fig. 4.

The circuit shown in Fig. 6 is an alternate method of changing the well known Powers code to the bi-quinary code. In this case the encoding circuit results are applied to a series of five gates which are electron discharge devices in series with a pulse generator. The pulse generator sends its output pulses over a series of five lines to designate values in the bi-quinary code. The pulse generator circuit has been described in U. S. patent application S. N. 18,782, filed April 3, 1948, now issued as Patent No. 2,512,851. When the pulse generator is operated it sends pulses over all the five lines, and the gates 134–138, inclusive, may be turned on by the encoding action of the lamp circuit to give the proper digit valued pulses over the output lines 140. The input pulses applied to the gates are positive and have a value of about 15 volts. It is contemplated that the Powers code (see Fig. 5) will be sensed from a punched card or punched tape and that this sensing operation will actuate switches 141–145, inclusive, it being a feature of the Powers code that one of the switches 141–144, inclusive, will be operated singly or else one of these switches will be operated in connection with switch 145.

Switches 141 to 144 have their movable contact points connected to ground over conductor 147 while the lower or normal contact points are each connected to two neon lamps which are cross-hatched in Fig. 6 to denote their lighted condition. The other terminals of these lamps are connected through separate resistors to the 200 volt supply line. Switch 145 also has its movable contact point grounded with both the lower and upper stationary points connected to a series of neon lamps.

The decoding circuit uses a total of 39 neon lamps which may be generally divided into several groups. A series of four lamps 150 to 153 shows when the first four sensing switches are in their operated condition. A group of 13 alternative lamps 154 are employed to control the current through other lamps and are connected in the circuit in such a manner that whenever any one of them is lighted some other lamp is extinguished.

A third group of 17 lamps 155 is employed as switching elements to selectively route currents to coded resistors.

A fourth group of lamps 156 to 160, inclusive, controls the potential of the control electrodes of triodes 134 to 138.

In order to explain the operation of the circuit and to disclose other features of the invention let it first be assumed that the circuit is in its normal or quiescent state and none of the sensing switches have been actuated. In this condition nine of the neon lamps, all in the switching group 155, will be lighted. The cross-hatched lamps 165 to 173, inclusive, indicate lamps in the lighted condition and a supply circuit for these lamps may be traced from the 200 volt conductor, through any one of the nine resistors marked 1 to 9, inclusive, thence through the lamp to the lower contact point of one of the five sensing switches and back to the battery over conductor 147. Lamps 165, 167, 169, 171, and 173 will be lighted because there is no other circuit available; however, any one or all of lamps 166, 168, 170, 172 may be non-conducting and instead lamps 175, 176, 177, and 178 may be lighted. Because of the inherent instability of arc or glow lamps to operate in parallel connection only one lamp connected to a single resistor will remain lighted.

All the lamps 156 to 160 in the fourth or control group will be lighted because they receive current from the 130-volt tap on the power supply in series with two resistors. None of the other lamps will be lighted because the circuit does not provide terminal voltages of 75 volts or over, the starting potential for these lamps.

The five triodes 134 to 138, inclusive, are in a non-conducting condition since the lighted lamps 156 to 160 provide current for resistors 181 to 185 and produce a voltage drop of 20 volts. This drop added to the 10 volts provided by the battery (140—130) keeps the control electrodes —30 volts with respect to the cathodes and a 15-volt pulse arriving from the pulse generator cannot be transmitted by the triode.

Now let it be assumed that a "1" is sensed in a punched card, thereby actuating the 1-2 switch 141 and causing the movable contact point to make contact with the upper point. Lamps 165 and 166 (if lighted) will go out since conductor 186 is now disconnected from ground. If lamp 175 was in a lighted condition it will remain lighted, and if it was out it will be lighted. When the current is cut off from resistor 1 the voltage drop is lowered until lamp 187 is lighted. This action draws current from the high voltage conductor 146, through resistor 1, thence through lamp 187, through resistor 188 to ground. As soon as the current builds up in resistor 188, the rise in potential across it lowers the voltage across lamp 156 so that it is extinguished.

Therefore, a short time (100 microseconds) after switch 141 has been actuated, lamps 156, 165, and 166 will be extinguished; lamps 175 and 187 will be lighted and the potential of the control electrode in tube 134 will be raised to 10 volts below the cathode potential where a 15-volt pulse from the generator applied over conductor 190 can pass through gate 134 and be sent over conductor 191 to a load circuit which may be the bi-quinary accumulator. This signal carries the value of "1."

When a "2" is sensed in the Powers code switches 141 and 145 are both actuated, thereby disconnecting conductors 186 and 202 from ground. This extinguishes lamps 165 and 173. If lamp 166 was lighted it is put out by the actuation of switch 141 and if lamp 175 was lighted it is put out by the actuation of switch 145. When switch 141 causes conduction through the upper pair of contacts, lamp 150 is lighted by means of a circuit which may be traced from the ground conductor 147 through switch 141, through the lamp 150, over conductor 192, through resistor 9 to the high potential conductor 146. This current retains the voltage drop across resistor 9, prevents lamps 193 and 194 from lighting, and retains the conduction through control lamp 160.

When switch 145 causes conduction through the upper set of contacts, lamp 195 is lighted (since lamp 165 was just put out) and a current flow is retained through resistor 1. This prevents lamp 156 from being put out. When the two switches 141 and 145 are actuated as outlined above, lamps 166 and 175 are both deprived of current; therefore, the voltage drop across resistor 2 is reduced toward zero and lamp 196 is lighted because of the circuit which may be traced from ground, conductor 147, resistor 197, lamp 196, conductor 198, resistor 2, to the high voltage conductor 146. When lamp 196 is lighted the voltage drop across resistor 197 causes control lamp 157 to go out and the control electrode of triode 135 is raised to a potential which will permit pulses from a pulse generator to pass through the tube to output conductor 199.

When a "3" is sensed in the Powers code only the 3-4 switch 142 is actuated. The action is similar to that due to the actuation of the 1-2 switch 141. Lamps 167 and 168 (if lighted) are extinguished and lamp 176 is in its lighted condition. This action causes lamps 200 and 201 to be lighted due to the lowering of the voltage drop across resistor 3. The lighting of these two lamps causes lamps 156 and 157 to be extinguished, thereby sending signals over output conductors 190 and 199 to register a "3" in a load circuit.

When a "9" is sensed by actuating only the 9 sensing switch 145, lamp 173 is extinguished because the ground connection is removed from conductor 202. Any number or all of lamps 175, 176, 177, and 178 may have been lighted before the sensing operation instead of the lamps above them, as indicated by the cross-hatched lines. If this were the case these lamps will be extinguished when the lower contacts of switch 145 are broken. When lamp 173 is extinguished, current flow through resistor 9 is reduced toward zero and the potential of conductor 192 increases so that lamps 193 and 194 are both lighted. These two lamps have a common resistor 9 which ordinarily would preclude their both being lighted; however, in the present circuit, lamp 193 is in series with resistor 203, and lamp 194 is in series with resistor 188, each of sufficient value to permit both lamps to conduct in a stable condition. The passage of current through resistors 188 and 203 increases the potential of conductors 204 and 205 and extinguishes lamps 156 and 160. This action, as in the above described circuits, opens gates 134 and 138 to permit pulses to pass through them when the pulse generator is in operation and actuating signals are then sent over conductors 190 and 206 to register a count of nine.

Figure 7:
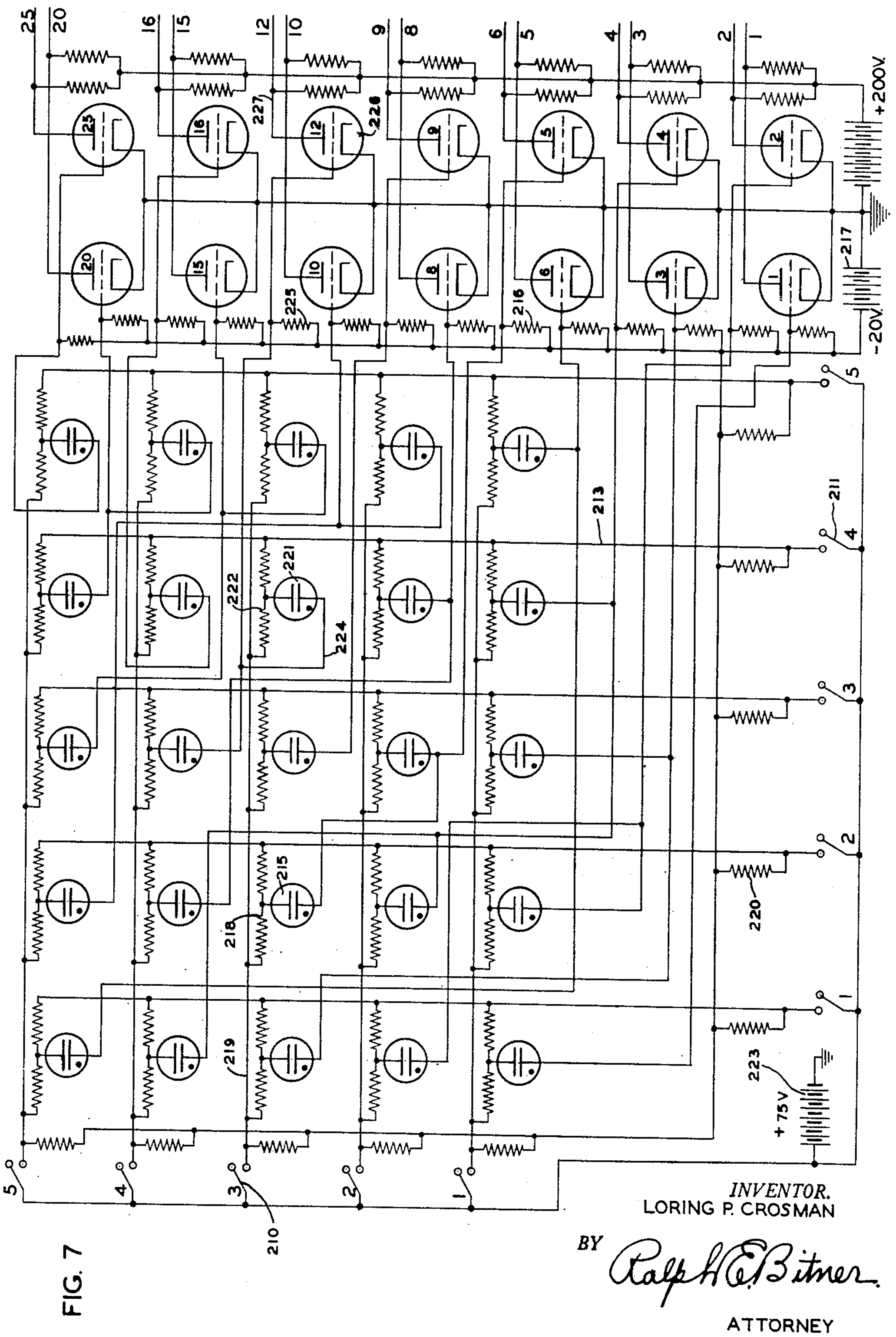
Fig. 7 is a schematic diagram of connections which shows the multiplication table up to 5, and receives two factors within that range, transforming them into their product.

The circuit illustrated in Fig. 7 is a function table and comprises a series of output circuits and two sets of input circuits. Function tables may be used to determine many mathematical functions such as logarithms, trigonometric functions, and other sets of numbers which can properly be put in the form of a table. The present table, as illustrated in the figure, is a multiplication table, the two sets of inputs comprising the digits from 1 to 5, and the output circuits comprising all the possible products which may be obtained by multiplying any two figures within this range. The circuit includes twenty-five neon lamps, each of which is connected to a voltage divider and to a product tube which relays the product value to a utilization circuit. There are fourteen output circuits since there are only fourteen product values as a result of multiplying any number from 1 to 5 by any other number in the same range. The voltage dividers have their mid-point connected to one terminal of the neon lamps, and their end points are connected, respectively, to the switch points of the sensing switches designated by the factor digits. A power supply for the output triodes and a separate power supply for the neon lamps is included in the circuit.

In order to illustrate the operation of the device, let it be assumed that a "3" is to be multiplied by a "4." Then, switch 210 is closed in the vertical set of switches, and switch 211 is closed in the horizontal set. This action applies a 75-volt potential on conductor 219 and also a 75-volt potential on conductor 213. It will be obvious that when no switches are closed none of the neon lamps will be lighted becaused they have no current supply whatever. With the switches closed as described above, a lamp such as 215 will not be lighted. This lamp has its lower terminal connected through a resistor 216 to battery 217 and ground, thereby putting a —20 volts on its lower electrode. The upper electrode is connected to the mid-point of voltage divider 218 which has a potential of 75 volts above ground on its left hand terminal, and through resistor 220 to the —20 volt battery 217. The mid-point of voltage divider 158 is, therefore, 47½ volts above the lower terminal of the neon lamp, and at this voltage the lamp will not light because the striking voltage of these lamps happens to be in the neighborhood of 75 volts. The neon lamp 221, which is connected to switches 210 and 211, will be lighted because, by virtue of the double actuation of these switches, it receives a voltage in excess of 85 volts. One end of the voltage divider 222 is connected through switch 210 to the positive terminal of the 75 volt battery 223, and the other terminal of the voltage divider is connected through switch 211 to the same line. Therefore, the mid-point of the voltage divider and the upper lamp electrode will tend to be at a potential of 75 volts above ground. The lower electrode of lamp 221 is connected by conductor 224 through resistor 225 to the negative terminal of 20-volt battery 217, thereby impressing a potential difference of 95 volts across the tube, causing it to light. When lamp 221 is lighted it passes current from the voltage divider over conductor 224 through resistor 225, thereby raising the potential of the control electrode of triode 226. The triodes contemplated for use in this circuit are tubes which have a cut-off point of 15 volts below the cathode potential so that when no factor switches have been actuated none of the triodes in the output section are conducting current through the anode circuits, and all the anodes will be at 200 volts potential. When the voltage is raised on the control electrode current flows through the anode to the cathode, thereby lowering the potential of the anode circuit a considerable amount below the 200 volt maximum. The load or utilization circuit may be designed to act on the decrease of anode potential or it may be designed to give an indication due to the current flow from the anode circuit.

The result of the above described action is to produce a measurable change in characteristics of anode conductor 227 which carries the information to the load circuit that product 12 is the result of the actuation of switches 3 and 4. It will be obvious that this function table may be increased to include all the digits between 1 and 9 in both sets, the output circuits thereby increasing to the usual thirty-six product values given by the multiplication table. Such a circuit may be used in multiplying machines for rapid determination of the partial products.

While there have been described and illustrated specific embodiments of the invention, it will be obvious that various changes and modifications may be made therein without departing from the field of the invention which should be limited only by the scope of the appended claims.

What is claimed is:

1. A decoding circuit for translating digital data from an initial code into an end code comprising, a series of trigger input conductors adapted to receive and transmit electrical pulses arranged in accordance with the initial code, a circuit containing an array of gaseous discharge devices coupled to the input conductors for translating the electrical pulses into the end code, said devices having at least two electrodes and adapted to be lighted by a characteristic voltage value and to pass current in a steady state condition at a lower voltage value, and an output circuit connected to the array of gaseous discharge devices and including three-electrode electron discharge devices for transferring electrical values to a load circuit.

2. A decoding circuit for translating digital data from an initial code into an end code comprising, a series of trigger input conductors each designated by a code value and adapted to receive and transmit electrical pulses arranged in accordance with the initial code, a circuit containing an array of gaseous discharge devices coupled to the input conductors for translating the electrical pulses into the end code, said devices having at least two electrodes and adapted to be lighted by a characteristic voltage value and to pass current in a steady state condition at a lower voltage value, and three triode amplifier stages each connected to certain of the discharge devices of the array and the outputs of each having an assigned digital value.

3. A decoding circuit for translating digital data from an initial code into an end code comprising, a series of trigger input conductors each designated by a code value and adapted to receive and transmit electrical pulses arranged in accordance with the initial code, a circuit containing an array of gaseous discharge devices coupled to the input conductors for translating the electrical pulses into the end code, said devices having at least two electrodes and adapted to be lighted by a characteristic voltage value and to pass current in a steady state condition at a lower voltage value, an output circuit including three triode electron discharge elements each having an assigned digital value and each connected by a common resistor to certain gaseous discharge devices of the array, and one or more gaseous discharge devices of the array being connected to each trigger conductor.

4. A decoding circuit for translating digital data from an initial code into an end code of binary values comprising, a series of trigger input conductors each designated by a code value and adapted to receive and transmit electrical pulses arranged in accordance with the initial code, a circuit containing an array of gaseous discharge devices coupled to the input conductors for translating the electrical pulses into the end code, said devices having at least two electrodes adapted to be lighted by a characteristic voltage value and to pass current in a steady state condition at a lower voltage value, and three output circuits each assigned a particular binary value and each output circuit including a triode electron discharge element connected by an impedance to certain of the gaseous discharge devices of the array.

5. A decoding circuit for translating digital data from an initial code into an end code of binary values comprising, a series of trigger input conductors each designated by a code value and adapted to receive and transmit electrical pulses having a value equal to or greater than a predetermined voltage value and arranged in accordance with the initial code, a circuit containing gaseous discharge devices coupled to the input conductors for translating the electrical pulses into the end code, said devices having at least two electrodes adapted to be lighted by a characteristic voltage value and to pass current in a steady state condition at a lower voltage value, some of said devices connected in series arrangement with one or more resistors and also connected between the input conductors and an output circuit, said output circuit including three-electrode electron discharge devices for transferring electrical binary values to a load circuit.

6. An electronic decoding circuit for translating electrical digital data from an initial code into an end code of electrical binary values comprising, a plurality of trigger stages each having two output lines, a plurality of input conductors each designated by a code value and each arranged to receive and transmit electrical pulses to actuate one of the trigger stages, said output lines connected so as to alternately assume one of two voltage values depending upon the state of actuation of the trigger stage, a circuit containing an array of gaseous discharge devices, one output of each trigger stage being connected to one or more of said devices and being effective to fire said connected devices depending upon the state of actuation of the trigger stage, the other outputs of the triggers being ineffective to fire any of said devices, and a plurality of output buffer triodes each assigned a binary value and each connected to the output of certain ones of the gaseous discharge devices.

7. An electronic decoding circuit for translating digital data from an initial code into an end code of binary values comprising, a plurality of trigger stages each having two output lines, a series of input conductors each designated by a code value and each arranged to receive and transmit electrical pulses to actuate one of the trigger stages, said output lines connected so as to alternately assume one of two voltage values depending upon the state of actuation of the trigger stage, a circuit containing an array of gaseous discharge devices, one output of each trigger stage being connected to one or more of said discharge devices and being effective to fire said connected devices depending upon the state of actuation of the trigger stage, the other output line of each trigger stage being ineffective to fire any of said devices, and a group of three output triode stages each assigned a particular binary value and each arranged to pass a current flow to a load line upon firing of certain ones of the gaseous discharge devices.

8. A decoding circuit for translating digital data from an initial code into an end code comprising, a series of single pole-double throw switches including a common switch arm each designated by a code value and adapted to be actuated when data is received, a circuit containing a first group of gaseous discharge devices having at least two electrodes and having one terminal connected to one of the switch contact points and the other terminal connected to a common supply conductor, said devices adapted to be lighted by a characteristic voltage value and to pass current in a steady state condition at a lower voltage value, a series of electronic coupling devices for transferring the end code to a load circuit, and a second group of gaseous discharge devices having at least two electrodes and connected between said coupling devices and resistors which are connected to the common arm of said switches, said second group of devices having the property of passing no current when in the unlighted condition and of passing current to said coupling devices when lighted by a voltage rise above a critical voltage value.

9. An electronic circuit for translating electrical manifestations of one digital code form into an end code of electrical binary values, comprising a group of trigger stages each including a pair of valves, a group of gaseous discharge isolator tubes, one valve of each trigger stage having its output connected to a first terminal of one or more of the isolator tubes, the other output valve of each trigger stage being connected to ground, a group of three buffer triode stages each having its output connected to a load circuit transmission line representative of a particular binary value and each buffer stage having its grid input connected to a second terminal of certain isolator tubes, a plurality of input lines connected one to each valve of the trigger stages and so constructed and arranged that upon input signals over such lines actuating the isolator connected valves of the trigger stages consequent current flow to the connected isolator tubes will be effective to block conduction in the buffer stages and upon input signals over such lines actuating the ground connected valves of the trigger stages consequent non-current flow to the isolator tubes will allow conduction through the buffer stages to the load circuit transmission lines.

10. An electronic translating circuit for translating electrical digital values of one code into binary electrical values of another code, comprising trigger stages, transmission lines to receive and transmit actuating pulses to the trigger stages, gaseous discharge isolator tubes responsive to signals from the trigger stages, three triode amplifier stages controlled by the isolators and each having its grid connected through a common resistor to a particular group of the isolator tubes and each amplifier stage having an output line assigned a particular binary value.

11. An electronic translating circuit for translating electrical digital values of one code into electrical binary values of another code, comprising trigger stages, transmission lines to receive and transmit actuating pulses to the trigger stages, gaseous discharge isolator tubes controlled by the trigger stages, three triode amplifier stages controlled by the isolators and each including an output transmission line assigned a particular binary value.

References Cited in the file of this patent

UNITED STATES PATENTS

| Number | Name | Date |
|---|---|---|
| 2,146,576 | Haselton et al. | Feb. 7, 1939 |
| 2,407,320 | Miller | Sept. 10, 1946 |
| 2,409,689 | Morton et al. | Oct. 22, 1946 |
| 2,428,811 | Rajchman | Oct. 14, 1947 |
| 2,473,444 | Rajchman | June 14, 1949 |
| 2,495,075 | Mumma | Jan. 17, 1950 |
| 2,576,099 | Bray et al. | Nov. 27, 1951 |
| 2,603,716 | Low | July 15, 1952 |